US011256710B2

(12) United States Patent
Gulwani et al.

(10) Patent No.: US 11,256,710 B2
(45) Date of Patent: Feb. 22, 2022

(54) STRING TRANSFORMATION SUB-PROGRAM SUGGESTION

(71) Applicant: Microsoft Technology Licensing, LLC, Redmond, WA (US)

(72) Inventors: Sumit Gulwani, Sammamish, WA (US); Ranvijay Kumar, Sammamish, WA (US); Abhishek Udupa, Bellevue, WA (US); Craig Allen Lee, Issaquah, WA (US); Giovanni M. Della-Libera, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 964 days.

(21) Appl. No.: 15/299,412

(22) Filed: Oct. 20, 2016

(65) Prior Publication Data

US 2018/0113873 A1    Apr. 26, 2018

(51) Int. Cl.
*G06F 16/25* (2019.01)
*G06F 15/02* (2006.01)
(Continued)

(52) U.S. Cl.
CPC ........ *G06F 16/258* (2019.01); *G06F 15/0266* (2013.01); *G06F 16/90344* (2019.01);
(Continued)

(58) Field of Classification Search
CPC ............. G06F 16/258; G06F 16/90344; G06F 15/0266; G06F 17/2282; G06F 17/246; G06F 17/2795
See application file for complete search history.

(56) References Cited

U.S. PATENT DOCUMENTS 5,504,848 A * 4/1996 Yamada ................ G06F 17/246
715/205
5,790,760 A   8/1998 Arima
(Continued)

FOREIGN PATENT DOCUMENTS

CN    1400547 A    3/2003
CN   101639861 A    2/2010
(Continued)

OTHER PUBLICATIONS

Chris Webb, "New Ways to Concatenate Text in Excel 2016 With CONCAT() and TEXTJOIN()", Feb. 5, 2016, https://blog.crossjoin.co.uk/2016/02/05/new-ways-to-concatenate-text-in-excel-2016-with-concat-and-textjoin/. (Year: 2016).*
(Continued)

*Primary Examiner* — Jay A Morrison
(74) *Attorney, Agent, or Firm* — Alleman Hall Creasman & Tuttle LLP

(57) ABSTRACT

Examples are disclosed herein that relate to string transformation sub-program suggestion. One example provides, at a computing device, a method comprising receiving a dataset having a plurality of input strings; receiving a declarative user input associated with a desired string transformation sub-program to be performed using the dataset as input; in a search space having a plurality of string transformation sub-programs, reducing the search space based on (i) the user input and (ii) one or more of the plurality of input strings of the dataset, to thereby form a reduced search space, the reduced search space having at least one string transformation sub-program that is configured to transform one or more of the plurality of input strings of the dataset; and selecting, from the reduced search space, one or more suggested string transformation sub-programs.

18 Claims, 5 Drawing Sheets

(51) Int. Cl.
*G06F 16/903* (2019.01)
*G06F 40/16* (2020.01)
*G06F 40/18* (2020.01)
*G06F 40/247* (2020.01)

(52) U.S. Cl.
CPC .............. *G06F 40/16* (2020.01); *G06F 40/18* (2020.01); *G06F 40/247* (2020.01)

(56) References Cited

U.S. PATENT DOCUMENTS

| | | |
|---|---|---|
| 5,920,717 A | 7/1999 | Noda |
| 6,035,302 A | 3/2000 | Tonouchi |
| 6,327,699 B1 | 12/2001 | Larus et al. |
| 6,484,310 B1 | 11/2002 | Przybylski et al. |
| 6,882,999 B2 | 4/2005 | Cohen et al. |
| 6,963,871 B1 | 11/2005 | Hermansen et al. |
| 7,010,779 B2 | 3/2006 | Rubin et al. |
| 7,155,683 B1 | 12/2006 | Williams |
| 7,165,019 B1 | 1/2007 | Lee et al. |
| 7,254,569 B2 | 8/2007 | Goodman et al. |
| 7,376,937 B1 | 5/2008 | Srivastava et al. |
| 7,433,885 B2 | 10/2008 | Jones |
| 7,546,541 B2 | 6/2009 | Hori et al. |
| 7,676,444 B1 | 3/2010 | Venkatachary et al. |
| 7,979,268 B2 | 7/2011 | Lee |
| 8,065,336 B2 | 11/2011 | Armstrong et al. |
| 8,175,875 B1 | 5/2012 | Dean et al. |
| 8,332,383 B2 | 12/2012 | Posner et al. |
| 8,484,230 B2 | 7/2013 | Harnett et al. |
| 8,589,874 B2 | 11/2013 | Ralls et al. |
| 8,600,916 B2 | 12/2013 | Chen et al. |
| 8,601,019 B1 | 12/2013 | Weininger et al. |
| 8,650,207 B2 | 2/2014 | Gulwani et al. |
| 8,655,775 B1 | 2/2014 | Howe |
| 8,694,483 B2 | 4/2014 | Roulland et al. |
| 8,694,883 B2 | 4/2014 | Matsumoto |
| 8,799,234 B2 | 8/2014 | Gulwani et al. |
| 8,850,263 B1 | 9/2014 | Yourtee et al. |
| 8,850,310 B2 | 9/2014 | Rampson et al. |
| 8,972,930 B2 | 3/2015 | Gulwani |
| 9,002,758 B2 | 4/2015 | Gulwani et al. |
| 9,031,955 B2 | 5/2015 | Carasso et al. |
| 9,311,289 B1 | 4/2016 | Kaptur et al. |
| 2002/0069220 A1 | 6/2002 | Tran |
| 2003/0004874 A1 | 1/2003 | Ludwig et al. |
| 2003/0154187 A1 | 8/2003 | Hayakawa et al. |
| 2004/0158810 A1 | 8/2004 | Dove et al. |
| 2004/0210842 A1* | 10/2004 | Qamar .................. G06F 40/137 715/201 |
| 2004/0243618 A1 | 12/2004 | Malaney et al. |
| 2005/0080755 A1 | 4/2005 | Aoyama |
| 2005/0149536 A1 | 7/2005 | Wildes et al. |
| 2005/0182629 A1 | 8/2005 | Coorman et al. |
| 2005/0228640 A1 | 10/2005 | Aue et al. |
| 2005/0246681 A1 | 11/2005 | Little et al. |
| 2006/0161844 A1* | 7/2006 | Simkhay ............... G06F 17/246 715/212 |
| 2006/0206507 A1 | 9/2006 | Dahbour |
| 2007/0050700 A1 | 3/2007 | Simkhay et al. |
| 2007/0055493 A1 | 3/2007 | Lee |
| 2007/0078872 A1 | 4/2007 | Cohen |
| 2007/0244694 A1 | 10/2007 | Hosokawa |
| 2007/0250765 A1 | 10/2007 | Chen et al. |
| 2008/0282108 A1 | 11/2008 | Jojic et al. |
| 2009/0049354 A1 | 2/2009 | Buckley, Jr. |
| 2009/0077542 A1 | 3/2009 | Chou et al. |
| 2009/0106710 A1 | 4/2009 | Teig et al. |
| 2009/0110282 A1 | 4/2009 | Tanaka et al. |
| 2009/0119307 A1 | 5/2009 | Braun et al. |
| 2009/0119416 A1 | 5/2009 | Sirdevan et al. |
| 2009/0119584 A1 | 5/2009 | Herbst |
| 2009/0132477 A1 | 5/2009 | Zuev et al. |
| 2009/0210418 A1 | 8/2009 | Arasu et al. |
| 2009/0226081 A1 | 9/2009 | Zhou et al. |
| 2009/0288065 A1 | 11/2009 | Nathan et al. |
| 2009/0300326 A1 | 12/2009 | Sweeney |
| 2009/0327888 A1 | 12/2009 | Woolf et al. |
| 2010/0037127 A1 | 2/2010 | Tomasic et al. |
| 2010/0083092 A1 | 4/2010 | Schuller et al. |
| 2010/0125828 A1 | 5/2010 | Vasista |
| 2010/0146254 A1 | 6/2010 | Park et al. |
| 2010/0250563 A1 | 9/2010 | Cao et al. |
| 2010/0312549 A1 | 12/2010 | Akuwudike |
| 2011/0038531 A1 | 2/2011 | Arasu et al. |
| 2011/0119284 A1 | 5/2011 | Viswanathan et al. |
| 2011/0302553 A1 | 12/2011 | Gulwani |
| 2012/0011084 A1 | 1/2012 | Gulwani et al. |
| 2012/0011152 A1 | 1/2012 | Gulwani et al. |
| 2012/0192051 A1 | 7/2012 | Rothschiller et al. |
| 2012/0197887 A1 | 8/2012 | Anderson |
| 2013/0132410 A1 | 5/2013 | Rineer |
| 2013/0191714 A1 | 7/2013 | Rothschiller et al. |
| 2013/0226945 A1 | 8/2013 | Swinson et al. |
| 2013/0326475 A1 | 12/2013 | Gulwani et al. |
| 2013/0346982 A1 | 12/2013 | Kalai et al. |
| 2014/0059078 A1 | 2/2014 | Gulwani et al. |
| 2014/0195884 A1 | 7/2014 | Castelli et al. |
| 2014/0324583 A1 | 10/2014 | Chen et al. |
| 2014/0372854 A1* | 12/2014 | Otero ................... G06F 17/246 715/219 |
| 2014/0372857 A1 | 12/2014 | Otero et al. |
| 2015/0169530 A1* | 6/2015 | Otero ................... G06F 17/246 715/219 |
| 2015/0220605 A1 | 8/2015 | Syed et al. |
| 2015/0254530 A1 | 9/2015 | Gulwani et al. |
| 2016/0055157 A1 | 2/2016 | Morimoto et al. |
| 2016/0224621 A1* | 8/2016 | Bousquet ............ G06F 16/9535 |
| 2016/0259779 A1 | 9/2016 | LabskÝ et al. |
| 2017/0024424 A1* | 1/2017 | Almohizea ........... G06F 40/134 |
| 2017/0060367 A1* | 3/2017 | Berlingerio ........... G06T 11/206 |
| 2017/0090893 A1* | 3/2017 | Aditya ...................... G06F 8/51 |
| 2017/0109389 A1 | 4/2017 | Bardoliwalla et al. |
| 2017/0315683 A1* | 11/2017 | Boucher ............. G06F 16/2228 |
| 2018/0113922 A1 | 4/2018 | Gulwani et al. |
| 2018/0121525 A1 | 5/2018 | Simmons et al. |

FOREIGN PATENT DOCUMENTS

| | | |
|---|---|---|
| EP | 2506155 A1 | 10/2012 |
| WO | 9835306 A1 | 8/1998 |
| WO | 2010088523 A1 | 8/2010 |

OTHER PUBLICATIONS

Ji et al., "Efficient interactive fuzzy keyword search," Proceedings of the 18th international conference on World wide web, ACM, 2009. (Year: 2009).*

"Excel: Use Flash Fill, Concatenate and Text to Columns", by Hood, May 5, 2015, https://www.knowledgewave.com/blog/msoffice/excel-use-flash-fill-concatenate-and-text-to-columns.html. (Year: 2015).*

"How to concatenate a range with a delimiter", by John, Apr. 20, 2016, https://www.howtoexcel.org/vba/how-to-concatenate-a-range-with-a-delimiter/. (Year: 2016).*

"Working with Formulas and Functions in Excel 2013", by Johnson, May 8, 2013, https://www.informit.com/articles/article.aspx?p=2031329&seqNum=4 (Year: 2013).*

Working with Formulas and Functions, websites.delta.edu, msofficeintro_excel_b_working_with_formulas_and_functions.pdf, Aug. 19, 2013. (Year: 2013).*

"Non Final Office Action Issued in U.S. Appl. No. 15/299,329", dated Sep. 7, 2018, 24 Pages.

Gulwani, Sumit, "Programming by Examples (and its Applications in Data Wrangling)",Retrieved From: https://www.microsoft.com/en-us/research/wp-content/uploads/2016/12/pbe16.pdf:, Dec. 1, 2016, 22 Pages.

Hartl, Andreas, "A Visual Rendering of a Semantic Wiki Query Language", In Diploma Thesis, 2009, 122 pages.

Reader, John Georg, "Programming in Pictures", Published on: Nov. 1984 Available at: https://www.hcs64.com/files/Raeder - Programming in Pictures.pdf.

(56) References Cited

OTHER PUBLICATIONS

Bansal, Sumit, "Create an Excel Drop Down list with Search Suggestions", Published on: Oct. 2013 Available at: http://trumpexcel.com/2013/10/excel-drop-down-list-with-search-suggestions/.
Gulwani, Sumit, "Programming by Examples", Published on: Nov. 23, 2015 Available at: http://research.microsoft.com/en-us/um/people/sumitg/pubs/pbe16.pdf.
"Non-Final Office Action Issued in U.S. Appl. No. 15/338,161", dated Mar. 21, 2019, 16 Pages.
"Final Office Action Issued in U.S. Appl. No. 15/299,329", dated Mar. 18, 2019, 21 Pages.
Mitchell, T., "Generalization as Search," Artificial Intelligence, vol. 18, No. 2, Mar. 1982, 24 pages.
Nix, R., "Editing by Example," ACM Transactions on Programming Languages and Systems, vol. 7, No. 4, Oct. 1985, 22 pages.
Angluin, D., "Learning Regular Sets from Queries and Counterexamples," Information and Computation, vol. 75, No. 2, Nov. 1, 1987, 20 pages.
Richardson, D. et al., "Approaches to Specification-Based Testing," Proceedings of the Third ACM SIGSOFT Symposium on Software Testing, Analysis, and Verification (TAV3), Dec. 13, 1989, Key West, Florida, 11 pages.
Cypher, A., "EAGER: Programming Repetitive Tasks by Example," Proceedings of the SIGCHI Conference on Human Factors in Computing Systems (CHI '91), Apr. 28, 1991, New Orleans, Louisiana, 9 pages.
Vilar, J., "Query Learning of Subsequential Transducers," Proceedings of the 3rd International Colloquium on Grammatical Inference: Learning Syntax from Sentances (ICGI '96), Sep. 25, 1996, Montpellier, France, 12 pages.
Chattratichat, J. et al., "A Visual Language for Internet-based Data Mining and Data Visualization," Proceedings of the 1999 IEEE Symposium on Visual Languages, Sep. 13, 1999, Tokyo, Japan, 8 pages.
Schrodl, S. et al., "Inferring Flow of Control in Program Synthesis by Example," Proceedings of the 23rd Annual German Conference on Artificial Intelligence: Advances in Artificial Intelligence (KI '99), Sep. 13, 1999, 12 pages.
Lau, T. et al., "Version Space Algebra and its Application to Programming by Demonstration," Proceedings of the Seventeenth International Conference on Machine Learning (ICML '00), Jun. 29, 2000, Stanford, California, 8 pages.
Witten, I. et al., "Chapter 8—TELS: Learning Text Editing Tasks from Examples," Allen Cypher Website, Available Online at http://acypher.com/wwid/Chapters/08TELS.html, Available as Early as Dec. 7, 2000, Retrieved Jun. 13, 2012, 17 pages.
Lau, T. et al., "Learning Repetitive Text-editing Procedures with SMARTedit," in Book "Your Wish is My Command Programming by Example," Morgan Kaufmann Publishers Inc., Mar. 1, 2001, San Francisco, California, 14 pages.
Miller, R. et al., "Interactive Simultaneous Editing of Multiple Text Regions," Proceedings of the General Track : 2001 USENIX Annual Technical Conference, Jun. 25, 2001, Boston, Massachusetts, 16 pages.
Matskin, M. et al., "Value-Added Web Service Composition Using Automatic Program Synthesis," Proceedings of the Revised Papers from the International Workshop on Web Services, E-Business, and the Semantic Web (CAiSE '02/ WES '02), LNCS 2512, May 27, 2002, Toronto, Ontario, 12 pages.
Tejada, S. et al., "Learning Domain-Independent String Transformation Weights for High Accuracy Object Identification," Proceedings of the 8th ACM SIGKDD International Conference on Knowledge Discovery and Data Mining (SIGKDD '02), Jul. 23, 2002, Edmonton, Alberta, 10 pages.
Alvarez, M. et al., "FINDER: A Mediator System for Structured and Semi-Structured Data Integration," Proceedings of the 13th International Workshop on Database and Expert Systems Applications (DEXA '02), Sep. 6, 2002, Aix-en-Provence, France, 5 pages.
Lau, T. et al., "Programming by demonstration using version space algebra," Machine Learning, vol. 53, No. 1-2, Oct. 2003, 60 pages.

Lau, T. et al., "Learning Programs from Traces using Version Space Algebra," Proceedings of the 2nd International Conference on Knowledge Capture (K-CAP '03), Oct. 23, 2003, Sanibel Island, Florida, 8 pages.
"Planning, Installation, and Problem Determination Guide," Callpath Website, Available Online at https://web.archive.org/web/20040219025036/http://callpath.genesyslab.com/docs63/html/cpepipd/epipd142.htm, Available as Early as Feb. 19, 2004, Retrieved Feb. 24, 2010, 14 pages.
Lau, T. et al., "Programming shell scripts by demonstration," Proceedings of the AAAI-04 Workshop Program, W16: Supervisory Control of Learning and Adaptive Systems, Jul. 25, 2004, San Jose, California, 5 pages.
Gulwani, S. et al., "A Polynomial-Time Algorithm for Global Value Numbering," Proceedings of the 11th International Static Analysis Symposium (SAS 2004), LNCS 3148, Aug. 26, 2004 ,Verona, Italy, 17 pages.
Ko, A. et al., "Six Learning Barriers in End-User Programming Systems," Proceedings of the 2004 IEEE Symposium on Visual Languages—Human Centric Computing (VLHCC '04), Sep. 26, 2004, Rome, Italy, 8 pages.
"PADS Documentation," PADS Website, Retrieved Online at http://www.padsproj.org/doc.html, Available as Early as Mar. 20, 2005, Retrieved Jul. 5, 2010, 3 pages.
"Amazon.com: Tricks of the Microsoft Office gurus. (Business solutions): Paul. McFedries," Amazon Website, Offer to Sell Book, Available Online at https://www.amazon.com/Tricks-Microsoft-Office-Gurus-McFedries/dp/0789733692/ref=sr_1_2?ie=UTF8&qid=1488389104&sr=8-2&keywords=tricks+of+the+microsoft+office+gurus.+%28Business+solutions%29, Book Published Apr. 2005, 1 page.
Fisher, K. et al., "PADS: A Domain-Specific Language for Processing Ad Hoc Data," Proceedings of the 2005 ACM SIGPLAN Conference on Programming Language Design and Implementation (PLDI'05), Jun. 12, 2005, Chicago, Illinois, 10 pages.
Fisher, K. et al., "The Next 700 Data Description Languages," Conference Record of the 33rd ACM SIGPLAN-SIGACT Symposium on Principles of Programming Languages (POPL'06), Jan. 11, 2006, Charleston, South Carolina, 14 pages.
Myers, B. et al., "Invited Research Overview: End-User Programming," Proceedings of the Extended Abstracts on Human Factors in Computer Systems (CHI EA '06), Apr. 22, 2006, Montreal, Quebec, 6 pages.
Embley, D. et al., "Table-processing paradigms: a research survey," International Journal of Document Analysis, vol. 8, No. 2, Jun. 2006, Published Online May 9, 2006, 21 pages.
Solar-Lezama, A. et al., "Sketching Stencils," Proceedings of the 28th ACM SIGPLAN Conference on Programming Language Design and Implementation (PLDI'07), Jun. 11, 2007, San Diego, California, 12 pages.
Fisher, K. et al., "From Dirt to Shovels: Fully Automatic Tool Generation from Ad Hoc Data," Proceedings of the 35th Annual ACM SIGPLAN-SIGACT Symposium on Principles of Programming Languages (POPL'08), Jan. 7, 2008, San Francisco, California, 14 pages.
De Moura, L. et al., "Z3: An Efficient SMT Solver," Proceedings of the Theory and Practice of Software: 14th International Conference on Tools and Algorithms for the Construction and Analysis of Systems (TACAS'08/ ETAPS'08), LNCS 4963, Mar. 29, 2008, Budapest, Hungary, 4 pages.
Lau, T., "Why PBD systems fail: Lessons learned from usable AI," Proceedings of the CHI 2008 Workshop on Usable Artificial Intelligence, Apr. 5, 2008, Florence, Italy, 4 pages.
Fisher, K. et al, "LearnPADS: Automatic Tool Generation from Ad Hoc Data," Proceedings of the 2008 ACM SIGMOD International Conference on Management of Data (SIGMOD '08), Jun. 9, 2008, Vancouver, British Columbia, 3 pages.
Zhang, Y. et al., "Editable Replay of IDE-based Repetitive Tasks," Proceedings of the 32nd Annual IEEE International Computer Software and Applications Conference (COMPSAC '08), Jul. 28, 2008, Turku, Finland, 8 pages.
Elhadi, M. et al., "Use of Text Syntactical Structures in Detection of Document Duplicates," Proceedings of the Third International

(56) References Cited

OTHER PUBLICATIONS

Conference on Digital Information Management (ICDIM 2008), Nov. 13, 2008, London, United Kingdom, 6 pages.
Xi, Q. et al., "Ad Hoc Data and the Token Ambiguity Problem," Proceedings of the 11th International Symposium on Practical Aspect of Declarative Languages (PADL 2009), Jan. 19, 2009, Savannah, Georgia, 15 pages.
Guaitieri, D. et al., "Executive Summary of: Deputize End-User Developers to Deliver Business Agility and Reduce Costs," Excerpt Available Online at https://www.forrester.com/report/Deputize+EndUser+Developers+To+Deliver+Business+Agility+And+Reduce+Costs/-/E-RES54191, Apr. 15, 2009, 2 pages.
Gong, H. et al., "Automating Microsoft Office Word in Visual Basic," Proceedings of the Second International Symposium on Electronic Commerce and Security (ISECS '09), May 22, 2009, Nanchang, China, 5 pages.
Arasu, A. et al., "Learning String Transformations From Examples," Proceedings of the 35th International Conference on Very Large Data Bases (VLDB '09), Aug. 24, 2009, Lyon, France, 12 pages.
"Amazon.com: Artificial Intelligence: A Modem Approach (3rd Edition) (9780136042594)," Amazon Website, Offer to Sell Book, Available Online at https://www.amazon.com/Artificial-Intelligence-Modern-Approach-3rd/dp/0136042597, Book Published Dec. 11, 2009, 6 pages.
"Program Synthesis," Microsoft Research Website, Available Online at https://www.microsoft.com/en-us/research/project/program-synthesis/, Jan. 1, 2010, 4 pages.
Srivastava, S. et al., "From Program Verification to Program Synthesis," Proceedings of the 37th Annual ACM SIGPLAN-SIGACT Symposium on the Principles of Programming Languages (POPL '10), Jan. 17, 2010, Madrid, Spain, 14 pages.
Das Sarma, A. et al., "Synthesizing View Definitions from Data," Proceedings of the 13th International Conference on Database Theory (ICDT '10), Mar. 23, 2010, Lausanne, Switzerland, 15 pages.
Jha, S. et al., "Oracle-Guided Component-Based Program Synthesis," Proceedings of the 32nd ACM/IEEE International Conference on Software Engineering—vol. 1 (ICSE '10), May 2, 2010, Cape Town, South Africa, 10 pages.
"Amazon.com: Excel 2010 Formulas (Mr. Spreadsheet's Bookshelf) (9780470475362)," Amazon Website, Offer to Sell Book, Available Online at https://www.amazon.com/Excel-2010-Formulas-John-Walkenbach/dp/0470475366/ref=mt_paperback?_encoding=UTF8&me=, Book Published May 24, 2010, 6 pages.
Chaudhuri, S. et al., "Smooth Interpretation," Proceedings of the 31st ACM SIGPLAN Conference on Programming Language Design and Implementation (PLDI '10), Jun. 5, 2010, Toronto, Ontario, 13 pages.
Kuncak, V. et al., "Complete Functional Synthesis," Proceedings of the 31st ACM SIGPLAN Conference on Programming Language Design and Implementation (PLDI '10), Jun. 5, 2010, Toronto, Ontario, 14 pages.
Xi, Q. et al., "A Context-free Markup Language for Semi-structured Text," Proceedings of the 31st ACM SIGPLAN Conference on Programming Language Design and Implementation (PLDI '10), Jun. 5, 2010, Toronto, Ontario, 12 pages.
"Sumit Gulwani's Homepage," Microsoft Research Website, Available Online at https://www.microsoft.com/en-us/research/people/sumitg/, Retrieved Jul. 5, 2010, 4 pages.
Gulwani, S., "Dimensions in Program Synthesis," Proceedings of the 12th International ACM SIGPLAN Symposium on Principles and Practice of Declarative Programming (PPDP '10), Jul. 26, 2010, 12 pages.
Gulwani, S., "Automating String Processing in Spreadsheets Using Input-Output Examples," Proceedings of the 38th Annual SIGPLAN-SIGACT Symposium on Principles of Programming Languages (PoPL'11), Jan. 26, 2011, Austin, Texas, 13 pages.
Harris, W. et al., "Spreadsheet Table Transformations from Examples," Proceedings of the 32nd ACM SIGPLAN Conference on Programming Language Design and Implementation (PLDI '11) Jun. 4, 2011, San Jose, California, 17 pages.
Singh, R. et al., "Learning Semantic String Transformations from Examples," Proceedings of the VLDB Endowment, vol. 5, No. 8, Apr. 2012, 16 pages.
Singh, R. et al., "Synthesizing Number Transformations from Input-Output Examples," Proceedings of the 24th International Conference on Computer Aided Verification (CAV 2012), LNCS 7358, Jul. 7, 2012, Berkeley, California, 72 pages.
ISA Korean Intellectual Property Office, International Search Report and Written Opinion Issued in Application No. PCT/US2011/037411, dated Feb. 9, 2012, WIPO, 8 pages.
United States Patent and Trademark Office, Office Action Issued in U.S. Appl. No. 12/834,031, dated May 10, 2012, 16 pages.
United States Patent and Trademark Office, Office Action Issued in U.S. Appl. No. 12/834,031, dated Oct. 15, 2012, 16 pages.
European Patent Office, European Search Report Issued in Application No. 11790189.2, dated Oct. 21, 2013, Germany, 2 pages.
European Patent Office, Office Action Issued in Application No. 11790189.2, dated Nov. 4, 2013, Germany, 6 pages.
United States Patent and Trademark Office, Office Action Issued in U.S. Appl. No. 13/020,153, dated Nov. 14, 2013, 10 pages.
United States Patent and Trademark Office, Office Action Issued in U.S. Appl. No. 12/834,031, dated Jan. 3, 2014, 20 pages.
State Intellectual Property Office of the People's Republic of China, Office Action and Search Report Issued in Application No. 201210023688.6, dated Jan. 30, 2014, 13 pages.
United States Patent and Trademark Office, Notice of Allowance Issued in U.S. Appl. No. 13/020,153, dated Mar. 20, 2014, 5 pages.
United States Patent and Trademark Office, Office Action Issued in U.S. Appl. No. 12/834,031, dated Jun. 5, 2014, 24 pages.
State Intellectual Property Office of the People's Republic of China, Office Action Issued in Application No. 201210023688.6, dated Sep. 12, 2014, 7 pages.
European Patent Office, Office Action Issued in Application No. 11790189.2, dated Dec. 3, 2014, Germany, 3 pages.
State Intellectual Property Office of the People's Republic of China, Office Action and Search Report Issued in Application No. 201180027421.8, dated Jan. 27, 2015, 11 pages.
European Patent Office, Office Action Issued in Application No. 11790189.2, dated Feb. 9, 2015, Germany, 3 pages.
De Choudhury, M. et al., "How Does the Data Sampling Strategy Impact the Discovery of Information Diffusion in Social Media?," Proceedings of the Fourth International AAAI Conference on Weblogs and Social Media, May 23, 2010, Washington, DC, 8 pages.
"Emftext User Guide," emftext Website, Available Online at http://www.emftext.org/EMFTextGuide.php, Jun. 1, 2012, 39 pages.
Gulwani, S. et al., "Spreadsheet Data Manipulation Using Examples," Communications of the ACM, vol. 55, No. 8, Aug. 2012, 9 pages.
Singh, R. et al., "Transforming Spreadsheet Data Types using Examples," Proceedings of the 43rd Annual ACM SIGPLAN-SIGACT Symposium on Principles of Programming Languages (POPL '16), Jan. 20, 2016, St. Petersburg, Florida, 14 pages.
"Smart Autofill Spreadsheets Add On," Google Cloud Platform Website, Available Online at https://cloud.google.com/prediction/docs/smart_autofill_add_on, As Last Updated Aug. 19, 2016, 9 pages.
Wang, X. et al., "FIDEX: Filtering Spreadsheet Data using Examples," Proceedings of the 2016 ACM SIGPLAN International Conference on Object-Oriented Programming, Systems, Languages, and Applications (OOPSLA 2016), Oct. 25, 2016, Amsterdam, The Netherlands, 20 pages.
ISA European Patent Office, International Search Report and Written Opinion Issued in PCT Application No. PCT/US2017/057779, dated Dec. 6, 2017, WIPO, 13 pages.
"Final Office Action Issued in U.S. Appl. No. 15/338,161", dated Oct. 29, 2019, 14 Pages.
"Non Final Office Action Issued in U.S. Appl. No. 15/299,329", dated Dec. 9, 2019, 14 Pages.
"Non-Final Office Action Issued in U.S. Appl. No. 15/338,161", dated Mar. 19, 2020, 8 Pages.
"Final Office Action Issued in U.S. Appl. No. 15/299,329", dated May 4, 2020, 16 Pages.

(56) References Cited

OTHER PUBLICATIONS

"Final Office Action Issued in U.S. Appl. No. 15/299,329", dated Apr. 1, 2021, 14 Pages.
"Non Final Office Action Issued in U.S. Appl. No. 15/299,329", dated Nov. 24, 2020, 18 Pages.

\* cited by examiner

|   | A | B | ... | N-1 | N |
|---|---|---|-----|-----|---|
| 1 | john.doe | 10.2.0.74 |  | john.doe,10.2.0.74 | |
| 2 | jane.smith | 10.2.0.76 |  | jane.smith,10.2.0.76 | |
| 3 | anne.hackett | 10.2.0.82 |  | anne.hackett,10.2.0.82 | |
| 4 | corey.riker | 10.2.0.49 |  | corey.riker,10.2.0.49 | |
| 5 | tom;lahey | 10.2.0.22 |  | tom;lahey,10.2.0.22 | |
| 6 | jim;bauer | 90.1.0.02 |  | jim;bauer,90.1.0.02 | |
| 7 | frank;kruger | 90.1.0.03 |  | frank;kruger,90.1.0.03 | |
| 8 | xiaoyu:peng | 68.0.0.74 |  | xiaoyu:peng,68.0.0.74 | |
| 9 | terrence:aldridge | 68.0.0.32 |  | terrence:aldridge,68.0.0.32 | |
| 10 | supreeth:venkar | 45.0.1.21 |  | supreeth:venkar,45.0.1.21 | |
| 11 | russ:middleton | 45.0.1.33 |  | russ:middleton,45.0.1.33 | |
|  | ... |  |  | ... | |
| k | marcus:mcray | 45.0.1.59 |  | marcus:mcray,45.0.1.59 | |

Alert! 114

We noticed that the output in column N-1 has multiple delimiters. Would you like to correct or undo the sub-program?

Apply , to all 118

Undo sub-program 120

Dismiss 122

FIG. 1B

STRING TRANSFORMATION SUB-PROGRAM SUGGESTION

BACKGROUND

In many computing contexts, user input is supplied regarding aspects of an output to be produced given an input. In some examples, such user input may include what is referred to as "declarative constraints". For example, a user may specify a single format in which to transform calendar dates having a variety of formats prior to transformation.

BRIEF DESCRIPTION OF THE DRAWINGS

FIGS. 1A-1C show an example spreadsheet application.

DETAILED DESCRIPTION

As described above, in many computing settings user input is supplied regarding aspects of an output to be produced given an input. In some examples, such user input may include what is referred to as "declarative constraints". As a particular example, a user may specify the format of an output string to be produced from an input string, such as specifying a dd/mm/yyyy output date format given an input string having a different date format.

In many scenarios in which declarative constraints and the like are supplied via user input, however, the exact specification of a constraint is required. For example, specifying a "join" operation in a database application or programming language may successfully effect the operation intended by a user, whereas natural language synonyms for join, such as "merge", "combine", and "concatenate", may not be supported and instead may fail to produce the intended operation. As such, users may need to have specific and detailed knowledge of supported constraints prior to attempting their use, or may attempt to identify supported constraints through trial-and-error. Further, other approaches to defining output may be unsuitable for certain datasets. Programming-by-example may render achieving desired output cumbersome for large and/or diverse datasets, for example.

To address these and other issues, approaches to suggesting string transformation sub-programs are disclosed herein. As described below, string transformation sub-programs may be suggested in a context-aware manner based on an input and/or a potential output, with support for inexact user input and synonyms. In this way, relatively general user input intent can lead to desired outcomes while reducing the user input supplied to effect such outcomes. As also described below, search space reduction may be performed to increase the accuracy, relevance, and speed of sub-program suggestion. A more efficient user experience and reduced computational load (e.g., processing, memory, bandwidth), among other potential technical effects, may result.

Figure 1A:
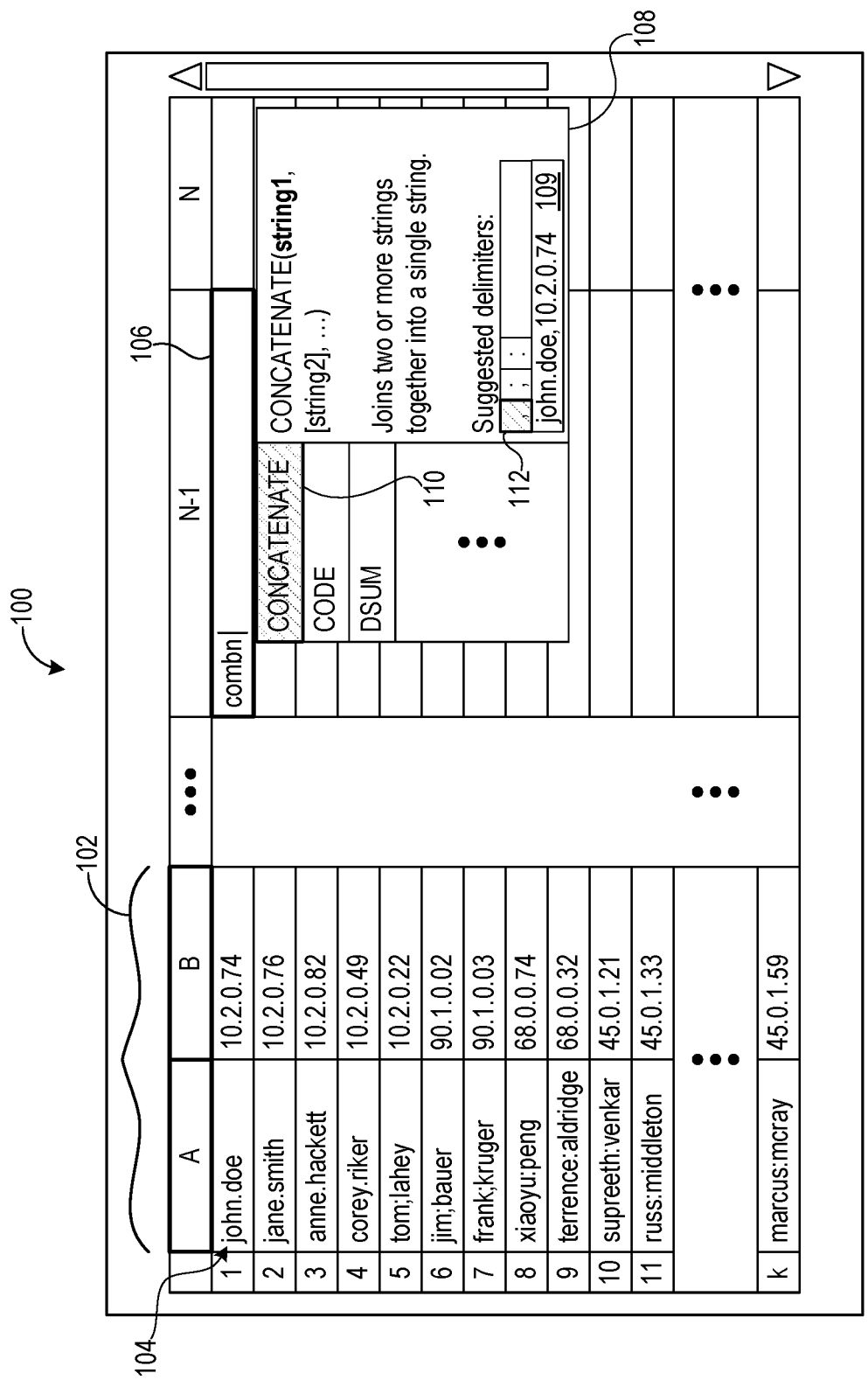

FIG. 1A shows an example spreadsheet application 100. Application 100 is operable to receive datasets having alphanumeric strings from various sources (e.g., local and remote storage). In the example depicted in FIG. 1A, application 100 has received a dataset 102, which includes a plurality of first-last name pairs with a period separating the first and last name of each pair, and a respective IP address corresponding to each first-last name pair. Each IP address may be a static IP address of a respective computing device corresponding to its associated user, for example, or may assume any other relation with its associated user. Each first-last name pair and/or IP address may be referred to herein as an "input string", such as input string 104 comprising "john.doe". As such, dataset 102 may be considered to include a plurality of input strings.

Spreadsheet application 100 includes a plurality of cells (e.g., cell 106) arranged in a rectangular grid of rows and columns. In the example depicted in FIG. 1A, dataset 102 is distributed across two columns, with the first-last name pairs arranged in a first column labeled "A", and the IP addresses arranged in a second column labeled "B". Application 100 may include any suitable number of rows and columns, and as such is shown with k rows and n columns.

Spreadsheet application 100 is operable to transform or otherwise process datasets in a variety of ways. To facilitate dataset transformation, application 100 may support a plurality of string transformation sub-programs. As used herein, a "string transformation sub-program" may refer to a program, operation, function, instruction set, code, and/or the like that is executable to produce string output based on string input. Accordingly, application 100 may support string transformation sub-programs including but not limited to those that add string content to input strings, reduce input strings, rearrange string components, extract substrings from input strings, format input strings, and assess or compare input strings, among other potential functions. As used herein, a "string transformation program" may include two or more string transformation sub-programs, though examples are contemplated in which a string transformation program includes a single string transformation sub-program. For example, a string transformation program may include two or more sub-programs that are applied to a common dataset (e.g., two sub-programs that each handle a different input date format for conversion into a common output format). Moreover, in some examples the suggestion and/or execution of two or more sub-programs may alternatively be implemented by using different arguments supplied to a lesser number of sub-programs.

Users of spreadsheet application 100 may attempt to convey a desired string transformation sub-program to be applied to a dataset provided to the application. Some users, however, may be unaware of whether the desired sub-program is supported by application 100, and/or how to effect the desired sub-program—e.g., which name(s) of the sub-program are supported by the application and that, when entered, will lead to execution of the sub-program. In FIG. 1A, a declarative user input, associated with a desired string transformation sub-program to be performed using dataset 102 as input, is received at application 100. In this example, the user input assumes the form of a string ("combn") entered in cell 106 that resembles, but does not exactly match, the supported name ("CONCATENATE") of the desired string transformation sub-program. Rather, the user input is a portion of a misspelled synonym (combine) of concatenate. However, application 100 suggests the desired string transformation sub-program by tolerating imprecise user input associated with the desired sub-program and by considering aspects of dataset 102, on which the desired sub-program is to be performed. As described in further detail below, the datatype, content, formatting, delimiters, and/or other properties associated with a dataset may be used to guide sub-program suggestion beyond what may be provided by merely considering user input associated with a desired sub-program. In the example depicted in FIG. 1A, the CONCATENATE string transformation sub-program is suggested via display in a user interface 108 in response to entry of the "combn" string.

To perform string transformation sub-program suggestion, spreadsheet application 100 may reduce a search space having a plurality of string transformation sub-programs based on various criteria. In some examples, the search space may include all string transformation sub-programs supported by application. The criteria may include the user input associated with the desired string transformation sub-program. For example, matches, including exact and/or inexact matches, between the user input and one or more of the plurality of string transformation sub-programs in the search space may be identified. For inexact matches, a threshold similarity condition may be evaluated such that one or more string transformation sub-programs that do not meet the threshold similarity condition relative to the user input are omitted from suggestion. The threshold similarity condition may be defined in various ways. For example, the threshold similarity condition may consider alphanumeric similarity with or without regard to ordering similarity (e.g., permutation similarity) between the user input and one or more string transformation sub-programs in the search space. In this way, user inputs that include a misspelled name of a desired string transformation sub-program may still lead to suggestion of the desired sub-program.

Alternative or additional criteria for reducing the search space are contemplated. For example, the search space may be reduced such that one or more suggested string transformation sub-programs include a suggested string transformation sub-program that is a synonym of the user input associated with the desired string transformation sub-program. In some implementations, both inexact matches and synonyms may be considered such that a misspelled synonym of a desired sub-program leads to its suggestion, as with the suggestion of the CONCATENATE sub-program in the example depicted in FIG. 1A.

String transformation sub-programs configured to transform one or more input strings in a dataset may be suggested. As such, the search space of spreadsheet application 100 may be reduced based on one or more of the plurality of input strings in dataset 102. In one example, string transformation sub-programs that are configured to transform the datatype of one or more input strings in dataset 102 may be suggested—e.g., sub-programs configured to transform strings, in contrast to non-suggested sub-programs configured to transform integers and/or other datatypes. In another example, suggested sub-programs may be configured to transform one or more of the delimiters found in one or more input strings in dataset 102—e.g., sub-programs configured to transform periods, in contrast to non-suggested sub-programs not configured to transform periods or other delimiters. Similarly, one or more delimiters to be used in executing a suggested sub-programs may be suggested. As examples, delimiter(s) of one or more of the following types may be suggested: (1) one or more delimiters found in a dataset, (2) one or more delimiters not found in a dataset, (3) one or more delimiters configured for use by the suggested sub-program, and/or (4) one or more delimiters selected from a predetermined list of common delimiters (e.g., ASCII delimiters) not found in a dataset. For example, the suggestion of the CONCATENATE sub-program may be accompanied by suggesting the use of a comma delimiter to join strings, as this delimiter is not found in dataset 102. As shown in FIG. 1A, the use of the comma delimiter may be suggested via display in user interface 108, which also displays a hint 109 indicating an example output resulting from executing the suggested sub-program using the suggested delimiter, among other examples corresponding to other delimiters. In some examples, hints indicating the example output of a sub-program may be provided for a plurality of input strings—e.g., a respective hint for each input string may be displayed in a corresponding row of an unoccupied column.

The input strings on which search space reduction is based may be indicated in various suitable ways. For example, search space reduction may consider one or more, and in some cases all, of the input strings supplied to spreadsheet application 100 upon initiating search space reduction. Search space reduction may be initiated in response to reception of a user input associated with a desired string transformation sub-program—e.g., in response to receiving the "c" in the "combn" string entered in cell 106. In this example, explicit user input indicating the input strings for search space reduction may be foregone. In other examples, user input may identify the input strings to be used for search space reduction using various suitable input devices—e.g., via alphanumeric specification of a range of cells, a selection of one or more columns such as columns "A" and "B".

User input received by spreadsheet application 100 may include a specification of a characteristic of output to be produced using a desired string transformation sub-program. The search space of application 100 may be reduced based on the specification of this output characteristic—e.g., such that string transformation sub-programs not configured to produce output having the characteristic are omitted from suggestion. The output characteristic may include various suitable criteria, such as a datatype (e.g., string, name, IP address) of the output to be produced using the desired sub-program, a delimiter to be included in the output, formatting of the output, etc. As yet another example, the specification of the output characteristic may include one or more user-provided example output strings from which output characteristic(s) may be inferred. The output characteristic be indicated in various suitable manners, and user input may select cell(s) and/or column(s) to which the output characteristic should be applied. For example, user input may stipulate that output produced in column "N−1" should include strings delimited by commas.

In some implementations, an output desired by a user of spreadsheet application 100 may be inferred and compared to outputs produced by one or more string transformation sub-programs to guide sub-program suggestion. The desired output may be inferred from the user input associated with a desired sub-program (e.g., without user input specifying output characteristic(s) of the desired sub-program). For example, inferring the desired output may include assessing the datatype which the desired sub-program is configured to produce output. In the example depicted in FIG. 1A, the desired sub-program CONCATENATE is configured to produce string output, and as such, the desired output may be inferred to include output strings. The desired output may then be compared to one or more transformed outputs respectively produced by applying one or more of the plurality of sub-programs in the search space of application 100 to the dataset with which the desired sub-program is to be executed.

Output comparison may include determining a respective congruence between one or more of the transformed outputs and the desired output. If a transformed output is deemed incongruent relative to the desired output, or fails to reach a threshold congruence with the desired output, the string transformation sub-program corresponding to that transformed output may be omitted from suggestion. In the example depicted in FIG. 1A, a string transformation sub-program that produced a transformed output having an output string may be suggested, for example, whereas sub-programs that produced non-string output may be omitted from suggestion. Other aspects, including but not limited to delimiters and/or formatting, may be considered in determining congruence. As another example, a desired output may be inferred that includes currency values rounded to thousands of cents and preceded by a dollar sign. Depending on how the threshold congruence is defined, a transformed output preceded by a pound sterling sign and rounded to any decimal place may be deemed incongruent, whereas a transformed output preceded by a dollar sign and rounded to tens, hundreds, or thousands of cents may be deemed congruent with the desired output. In this way, string transformation sub-program execution itself can be performed to inform sub-program suggestion. By evaluating aspects of output, the accuracy of sub-program suggestion may be increased relative to approaches that merely evaluate input, for example.

Search space reduction may include identifying one or more clusters among the plurality of input strings of a dataset, and suggesting a string transformation sub-program for each cluster. FIG. 1A illustrates several examples of cluster identification. In one example, at least three clusters may be identified among dataset 102, including a first cluster corresponding to first-last name pairs delimited by a period, a second cluster corresponding to first-last name pairs delimited by a semicolon, and a third cluster corresponding to first-last name pairs delimited by a colon. Based on the three identified clusters, a suggested sub-program may be selected for each cluster—e.g., a sub-program configured to transform period-delimited strings for the first cluster, a sub-program configured to transform semicolon-delimited strings for the second cluster, and a sub-program configured to transform colon-delimited strings for the third cluster. Alternatively, a common sub-program may be selected for all three clusters but executed for each cluster using the delimiter corresponding to that cluster as an argument of the sub-program.

As another example of cluster-based suggestion, at least two clusters may be identified among dataset 102, including a first cluster corresponding to the plurality of first-last name pairs arranged in column "A", and a second cluster corresponding to the plurality of IP addresses arranged in column "B". Based on the two identified clusters, a suggested sub-program may be selected for each cluster—e.g., a sub-program configured to transform human names for the first cluster, and a sub-program configured to convert IPv4 addresses to IPv6 addresses for the second cluster.

In view of the above, the search space of spreadsheet application 100 may be reduced based on a variety of criteria. For example, the search space may be reduced based on one or more of a user input associated with a desired string transformation sub-program (e.g., the "combn" string entered in cell 106), one or more of the plurality of input strings of a dataset (e.g., the first-last name pairs and IP addresses in columns "A" and "B"), a user input of a specification of an output characteristic (e.g., datatype, formatting, delimiter), a respective congruence between one or more transformed outputs and an desired output inferred from the user input associated with the desired sub-program, clusters identified among the dataset, identifying inexact matches and/or synonyms between the user input and one or more supported sub-programs, among other potential parameters. Using a selected set of criteria, the search space may be reduced to thereby form a reduced search space having at least one string transformation sub-program that is configured to transform one or more of the plurality of input strings of the dataset. The reduced search space may be a space from which one or more sub-programs are suggested, such as CONCATENATE.

Search space reduction may assume various suitable forms. For example, two or more iterations of search space reduction may be performed (e.g., for a given use-session). As a particular example, the search space of spreadsheet application 100 may be reduced at a first iteration in response to receiving dataset 102—e.g., to discard string transformation sub-programs not configured to transform the dataset—and subsequently at a second iteration in response to receiving the user input "combn" associated with CONCATENATE. Regardless of its form, search space reduction may significantly improve the performance of application 100, as the size of the unreduced search space may render searching therein computationally expensive. Further, search space reduction may increase the accuracy of sub-program suggestion by omitting from suggestion sub-programs not commensurate with the criteria with which reduction is performed. In both respects, the user experience associated with application 100 may be enhanced.

Suggested string transformation sub-program selection may include displaying the suggested sub-programs. To this end, FIG. 1A depicts the display at user interface 108 of suggested sub-programs CONCATENATE, "CODE", and "DSUM", selected according to one or more of the criteria described above. User interface 108 may include, for each suggested sub-program, a respective mechanism for applying that suggested sub-program to dataset 102—for example, FIG. 1A shows a control 110 selectable to apply the CONCATENATE sub-program to the dataset. It may be seen from FIG. 1A how user interface 108, and the general display of suggested sub-programs, may be operated as a search interface to apprise users of the sub-programs supported by spreadsheet application 100. FIG. 1A also shows the potential display of a respective mechanism for applying one or more suggested delimiters, such as a control 112 selectable to apply the period delimiter in conjunction with the CONCATENATE sub-program.

Suggested string transformation sub-program selection may include ranking the suggested sub-programs. For example, sub-programs having a higher congruence (e.g., between transformed outputs and a desired output, and/or with aspects of a dataset such as datatype) may be ranked relatively higher. Higher ranked sub-programs may be displayed at user interface 108 in relatively more prominent positions. For example, the CONCATENATE sub-program in user interface 108 may be displayed higher than the CODE and DSUM sub-programs as a result of its relatively higher ranking. Other considerations to sub-program ranking are contemplated, such as ranking sub-programs configured to transform more common clusters in a dataset higher than sub-programs configured to transform less common clusters in the dataset. Cluster size may drive sub-program suggestion in other ways. For example, a single sub-program may be suggested for two clusters of which the size of a first cluster dominates that of a second cluster. As another example, sub-program suggestion may differ as a function of the relative size among clusters—e.g., the computational resources allocated to each cluster in performing search space reduction may be substantially proportional to the size of that cluster.

A user input may be received for applying one or more suggested string transformation sub-programs to a dataset, in response to which the suggested sub-program may be applied. For example, the CONCATENATE sub-program may be applied to dataset 102 in response to receiving a user input in the form of a selection of control 110. FIG. 1B shows spreadsheet application 100 following application of the CONCATENATE string transformation sub-program to dataset 102. The output of the sub-program is displayed in column "N−1". FIG. 1B also illustrates how, following application of a sub-program to a dataset, an alert based on the output resulting from application of the sub-program may be determined. The alert may indicate an inconsistency between input and output, an incoherent/invalid/undefined output, and/or some other condition of which user notification may be desired. In particular, FIG. 1B shows the display of an alert 114 at a user interface 116, where the alert indicates detection of multiple delimiters (., ,, :, and ;) in the output produced in column "N−1", which may be regarded as a possible unintended or undesired inconsistency meriting user notification.

A mechanism may be provided at user interface 116 to receive feedback regarding alert 114. Various suitable types of feedback may be provided, which may vary with the type of determined alert. In the example depicted in FIG. 1B, the mechanism to receive feedback at user interface 116 includes a control 118 selectable to apply the comma delimiter to all output strings in column "N−1" (e.g., by replacing non-comma delimiters with commas), a control 120 selectable to undo application of the CONCATENATE string transformation sub-program, and a control 122 selectable to dismiss alert 114 and maintain the output generated by the sub-program. In some examples, selection of control 122 may be interpreted as confirmation of the correctness of the application of the CONCATENATE sub-program. Other mechanisms are contemplated, such as a mechanism for applying a corresponding sub-program to each cluster that corresponds to each delimiter type.

Figure 1C:
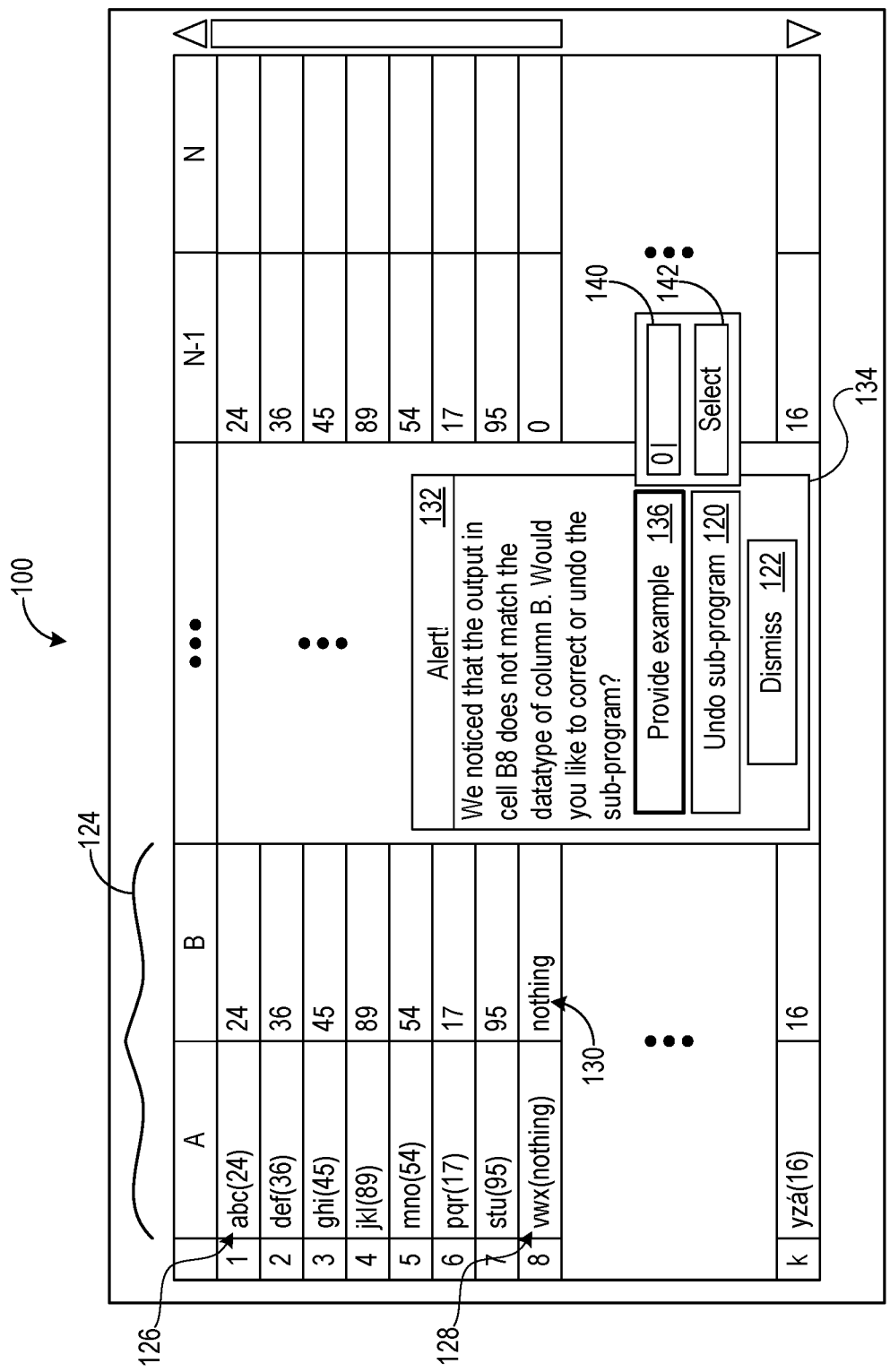

FIG. 1C shows another example illustrating the provision of feedback to spreadsheet application 100. In the depicted example, a dataset 124 is received by application 100 that includes input strings assuming the form of three letters followed by a left parenthesis, two numbers, and a right parenthesis, such as input string 126 ("abc(24)"). Based on user input, application 100 selects a string transformation sub-program that extracts the two numbers between the parentheses of each input string in dataset 124. The user input may be provided according to a programming-by-example paradigm, in which the user provides an example mapping input string 126 ("abc(24)") to an output string ("24"), for example, prompting application 100 to learn a sub-program that extracts the content between parentheses. FIG. 1C shows the plurality of output strings resulting from the application of this sub-program to dataset 124 in column "B".

The user input may further specify the datatype of column "B", and thus the datatype of the output springs produced therein. For example, the user input may specify that column "B" is to include numbers, and not letters. However, the selected string transformation sub-program produces output incongruent with the specified datatype—for an input string 128, which includes the string "nothing" within its parentheses, an output 130 is produced which contains the string "nothing", as the extraction of the content within the parentheses of the input strings in dataset 124 was the operation inferred when selecting the sub-program. Due to the incongruence of output 130 with the datatype specified for column "B", application 100 displays an alert 132 at a user interface 134 indicating the incongruence and providing a mechanism to receive feedback regarding the alert. In particular, user interface 134 includes a control 136 selectable to provide to application 100 an example output to be produced given input string 128 and potentially other similar input strings (e.g., those that include the string "nothing" between their parentheses, strings that include text strings in general between their parentheses, strings that do not include numbers between their parentheses). In the depicted example, control 136 is selected, prompting display of a menu 138, which includes a field 140 for inputting the example output and a control 142 for applying the example output. The number zero is entered in field 140 and control 142 is selected, prompting application of the sub-program using the supplied example output to input string 128 and potentially other similar input strings in dataset 124. FIG. 1C shows the result of applying the sub-program informed by this example output with its output displayed in column "N−1", wherein the number zero is produced from input string 128.

The example illustrated in FIG. 1C represents how user feedback may be used to inform and obtain desired results from a string transformation sub-program, and particularly how feedback may be applied in example form to inform a sub-program learned according to a user-driven programming-by-example paradigm. Informing a sub-program with user feedback as illustrated in FIG. 1C may be particularly applicable to very large datasets that are difficult to parse without computational acceleration; with the example approach depicted therein, a user may be notified of incongruent output via user interface 134 without searching for such incongruent output, and can provide feedback to correct a plurality of incongruent outputs without manually selecting each incongruent output to be corrected.

In some implementations, the results of applying a string transformation sub-program may be used to inform subsequent application of the same or different sub-program. As one example, the successful application of a sub-program to a first dataset may drive subsequent application of the same sub-program to a second dataset, such as one that is formatted and/or delimited similarly to the first dataset. In the example depicted in FIG. 1B, the successful application of the CONCATENATE sub-program to dataset 102—e.g., as inferred from user selection of control 122—may be used to suggest or rank higher the CONCATENATE sub-program (e.g., with commas as delimiters) in relation to another dataset. The other dataset may be formatted and/or delimited similarly to dataset 102 (e.g., a dataset that also includes strings delimited by periods, semicolons, and colons), for example.

In view of the above, spreadsheet application 100 may enable user supply of declarative constraints in a manner that tolerates inaccurate user input and a lack of knowledge of application support for sub-programs, and which accommodates general user intent including intent arising from other sources (e.g., applications, programming languages, natural languages). In this way, the barrier to sub-program application to datasets may be significantly reduced while informing users of the constraints supported by application 100. Further, the approaches described herein may facilitate sub-program suggestion in a manner that might otherwise be infeasible or impossible without computational acceleration due to the potentially large size of the search space of application 100 and/or the dataset(s) provided thereto. Such computational acceleration may be utilized to reduce the search space to thereby significantly lower the computational cost of sub-program suggestion, in turn enhancing the user experience (e.g., shortened search time, reduced user input) as described above. Other technical effects, including but not limited to reduced processor load, consumed bandwidth, and/or utilized memory, may result from computationally accelerated search space reduction.

It will be understood that application 100 is provided as an example and that the approaches described herein are applicable to other application types (e.g., word processors and productivity applications, database applications) and contexts (e.g., programming languages). Further, the approaches described herein are compatible with other approaches to data transformation and processing, such as programming-by-example, which in some scenarios may be combined with the supply of declarative constraints as described herein.

Figure 2:
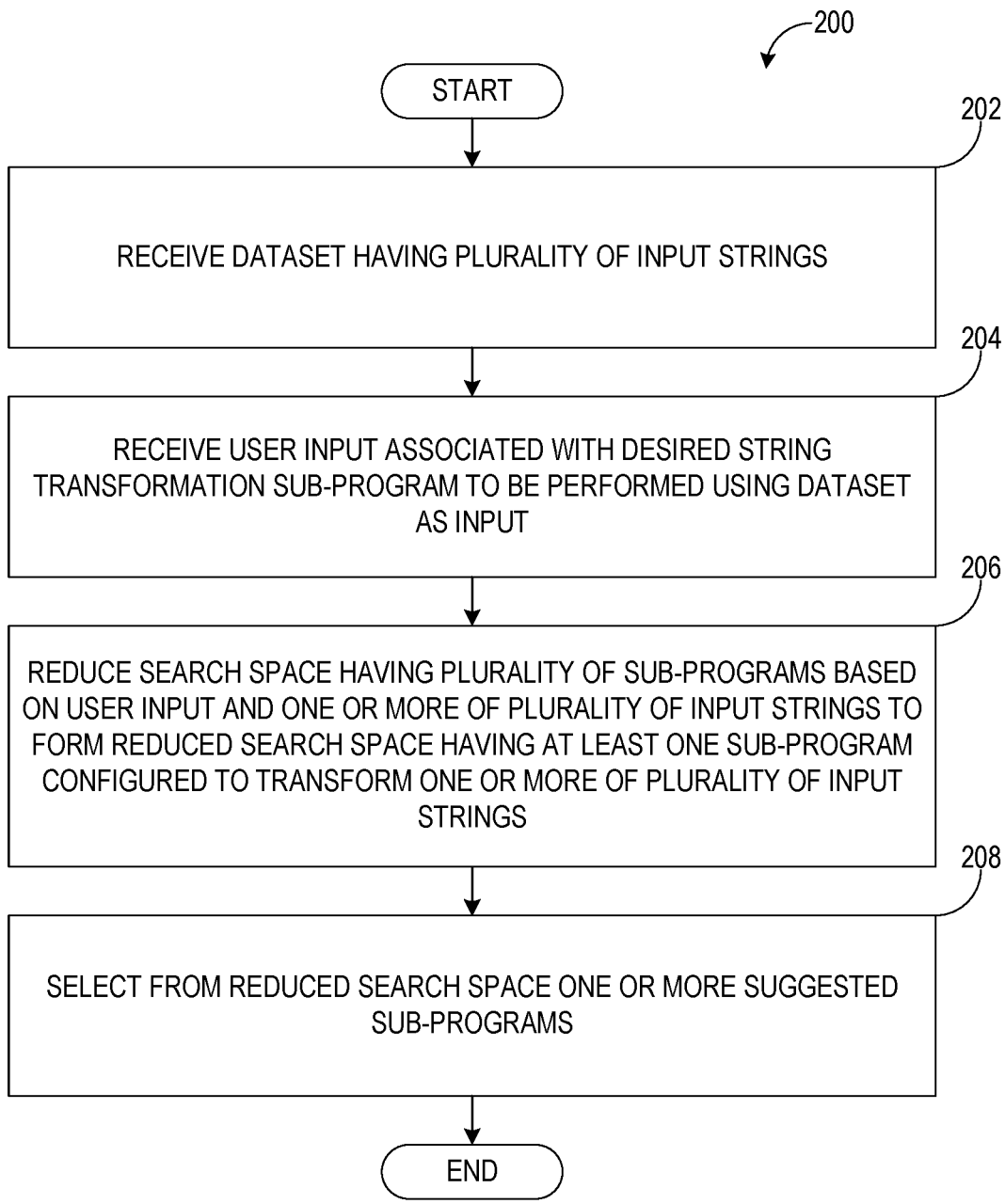
FIG. 2 shows a flowchart illustrating a method of suggesting string transformation sub-programs.

FIG. 2 shows a flowchart illustrating a method 200 of suggesting string transformation sub-programs. Method 200 may be implemented in spreadsheet application 100 of FIGS. 1A-1B, for example. As such, references to FIGS. 1A-1B are made throughout the description of method 200.

At 202, method 200 comprises receiving a dataset having a plurality of input strings. The dataset may be dataset 102, for example, and the plurality of input strings may be alphanumeric strings.

At 204, method 200 comprises receiving a declarative user input associated with a desired string transformation sub-program to be performed using the dataset as input. The user input may include a string, for example, and may be an inexact match and/or synonym of a supported sub-program.

At 206, method 200 comprises, in a search space having a plurality of string transformation sub-programs, reducing the search space based on (i) the user input and (ii) one or more of the plurality of input strings of the dataset, to thereby form a reduced search space. The reduced search space may have at least one string transformation sub-program that is configured to transform one or more of the plurality of input strings of the dataset.

Reducing the search space may include identifying inexact or exact matches and/or synonyms between the user input and one or more sub-programs in the search space, and may evaluate a threshold similarity condition between the user input and one or more sub-programs. Search space reduction may include identifying sub-programs configured to transform the datatype of the dataset and/or one or more of the delimiters found and/or not found therein. Search space reduction may be based on a specification of a characteristic (e.g., datatype, formatting, delimiter(s)) of output to be produced using the desired string transformation sub-program. Search space reduction may include comparing an inferred output desired by a user to outputs produced by one or more sub-programs. For example, inferring the desired output may include assessing the datatype in which the desired sub-program is configured to produce output.

Output comparison may include determining a respective congruence between one or more transformed outputs and the desired output. If a transformed output is deemed incongruent relative to the desired output, or fails to reach a threshold congruence with the desired output, the sub-program corresponding to that transformed output may be omitted from suggestion, for example. Other aspects, including but not limited to delimiters and/or formatting, may be considered in determining congruence.

Search space reduction may include identifying one or more clusters among the plurality of input strings of the dataset, and suggesting a string transformation sub-program for each cluster. Further, in some examples search space reduction may be performed for two or more iterations.

At 208, method 200 comprises selecting, from the reduced search space, one or more suggested string transformation sub-programs. Using a selected set of criteria, the search space may be reduced to thereby form a reduced search space having at least one string transformation sub-program that is configured to transform one or more of the plurality of input strings of the dataset. The reduced search space may be a space from which one or more sub-programs are suggested, such as the CONCATENATE sub-program. Suggested string transformation sub-program selection may include displaying the suggested sub-programs, for example at user interface 108 with control 110 selectable to apply the CONCATENATE sub-program. Suggested string transformation sub-program selection may include ranking the suggested sub-programs. Suggested string transformation sub-program selection may include displaying one or more suggested delimiters with respective controls such as control 112 for using the corresponding delimiter. As examples, delimiter(s) of one or more of the following types may be suggested: (1) one or more delimiters found in the dataset, (2) one or more delimiters not found in the dataset, (3) one or more delimiters configured for use by the suggested sub-program(s), and/or (4) one or more delimiters selected from a predetermined list of common delimiters (e.g., ASCII delimiters) not found in the dataset.

Method 200 may include alternative or additional steps not shown in FIG. 2. For example, method 200 may optionally comprise, in response to receiving a user input for applying one of the one or more suggested string transformation sub-programs, applying the suggested string transformation sub-program to the dataset, determining an alert based on an output resulting from applying the suggested string transformation sub-program to the dataset, displaying the alert at a user interface, and providing a mechanism to receive user feedback regarding the alert at the user interface. The user input may be user selection of a control such as control 110, for example. The alert may be alert 114, for example, displayed at user interface 116. The mechanism to receive user feedback may include one or more of controls 118, 120, and 122, for example.

In some implementations, the functions performed by spreadsheet application 100 described herein, which may include but are not limited to the reception of user input, reception of a dataset having a plurality of input strings, reduction of a search space, and sub-program selection from the search space, may be implemented in instructions stored in a storage machine (e.g., memory) and that are executable by a logic machine (e.g., processor).

Figure 3:
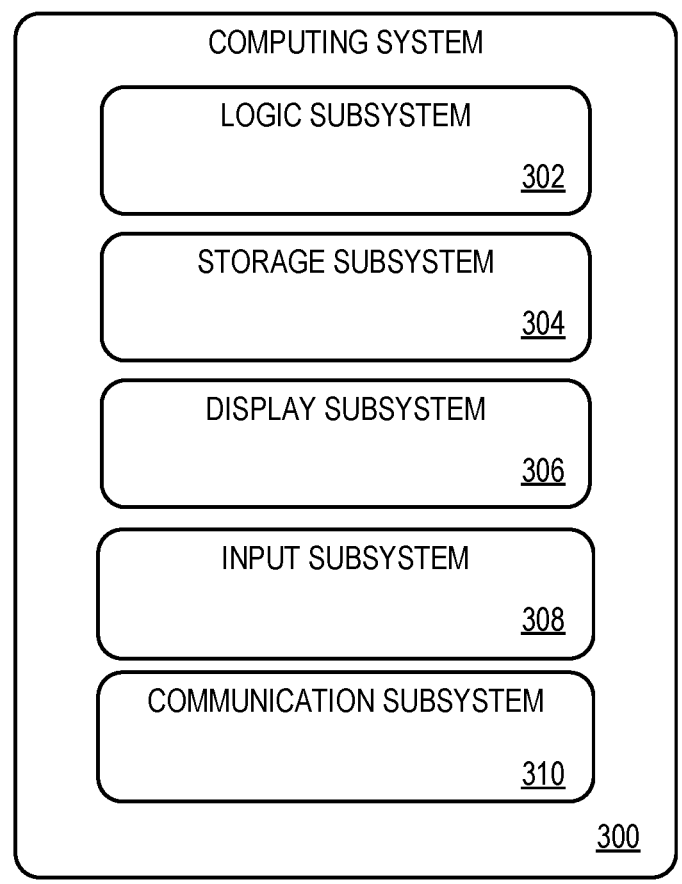
FIG. 3 is a block diagram of an example computing device.

FIG. 3 schematically shows a non-limiting embodiment of computing system 300 that can enact one or more of the methods and processes described above. Computing system 300 is shown in simplified form. Computing system 300 may take the form of one or more personal computers, server computers, tablet computers, home-entertainment computers, network computing devices, gaming devices, mobile computing devices, mobile communication devices (e.g., smart phone), and/or other computing devices.

Computing system 300 includes a logic machine 302 and a storage machine 304. Computing system 300 may optionally include a display subsystem 306, input subsystem 308, communication subsystem 310, and/or other components not shown in FIG. 3.

Logic machine 302 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 304 includes one or more physical devices configured to hold instructions executable by the logic machine to implement the methods and processes described herein. When such methods and processes are implemented, the state of storage machine 304 may be transformed—e.g., to hold different data.

Storage machine 304 may include removable and/or built-in devices. Storage machine 304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 304 may include volatile, nonvolatile, dynamic, static, read/write, read-only, random-access, sequential-access, location-addressable, file-addressable, and/or content-addressable devices.

It will be appreciated that storage machine 304 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 302 and storage machine 304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 implemented to perform a particular function. In some cases, a module, program, or engine may be instantiated via logic machine 302 executing instructions held by storage machine 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 306 may be used to present a visual representation of data held by storage machine 304. This visual representation may take the form of a graphical user interface (GUI). As the herein described methods and processes change the data held by the storage machine, and thus transform the state of the storage machine, the state of display subsystem 306 may likewise be transformed to visually represent changes in the underlying data. Display subsystem 306 may include one or more display devices utilizing virtually any type of technology. Such display devices may be combined with logic machine 302 and/or storage machine 304 in a shared enclosure, or such display devices may be peripheral display devices.

When included, input subsystem 308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 310 may be configured to communicatively couple computing system 300 with one or more other computing devices. Communication subsystem 310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 300 to send and/or receive messages to and/or from other devices via a network such as the Internet.

The subject matter of the present disclosure is further described in the following paragraphs. One aspect provides, at a computing device, a method comprising receiving a dataset having a plurality of input strings, receiving a declarative user input associated with a desired string transformation sub-program to be performed using the dataset as input, in a search space having a plurality of string transformation sub-programs, reducing the search space based on (i) the user input and (ii) one or more of the plurality of input strings of the dataset, to thereby form a reduced search space, the reduced search space having at least one string transformation sub-program that is configured to transform one or more of the plurality of input strings of the dataset, and selecting, from the reduced search space, one or more suggested string transformation sub-programs. In this aspect, the user input alternatively or additionally may include a specification of a characteristic of output to be produced using the desired string transformation sub-program, and the search space alternatively or additionally may be reduced based on the specification of the characteristic. In this aspect, the search space alternatively or additionally may be reduced by determining a respective congruence between one or more transformed outputs and a desired output, the one or more transformed outputs respectively produced by applying one or more of the plurality of string transformation sub-programs in the search space to the dataset, and the desired output inferred from the user input associated with the desired string transformation sub-program. In this aspect, reducing the search space alternatively or additionally may include identifying inexact matches between the user input associated with the desired string transformation sub-program and one or more of the plurality of string transformation sub-programs in the search space, such that one or more of the plurality of string transformation sub-programs that do not meet a threshold similarity condition relative to the user input associated with the desired string transformation sub-program are excluded from the reduced search space. In this aspect, the one or more suggested string transformation sub-programs alternatively or additionally may include a suggested string transformation sub-program that is a synonym of the user input associated with the desired string transformation sub-program. In this aspect, reducing the search space alternatively or additionally may include identifying one or more clusters among the plurality of input strings, and selecting the one or more suggested string transformation sub-programs alternatively or additionally may include, for each cluster, selecting a suggested string transformation sub-program corresponding to that cluster. In this aspect, selecting the one or more suggested string transformation sub-programs alternatively or additionally may include displaying the one or more suggested string transformation sub-programs at a user interface. In this aspect, the user interface alternatively or additionally may include, for each of the one or more suggested string transformation sub-programs, a respective mechanism for applying that suggested string transformation sub-program to the dataset. In this aspect, the method alternatively or additionally may comprise in response to receiving a user input for applying one of the one or more suggested string transformation sub-programs, applying the suggested string transformation sub-program to the dataset, determining an alert based on an output resulting from applying the suggested string transformation sub-program to the dataset, displaying the alert at a user interface, and providing a mechanism to receive user feedback regarding the alert at the user interface. In this aspect, the method alternatively or additionally may comprise selecting one or more suggested delimiters selected from a predetermined list of delimiters not found in the dataset. In this aspect, selecting the one or more suggested string transformation sub-programs alternatively or additionally may include ranking the one or more suggested string transformation sub-programs.

Another aspect provides a system comprising means for receiving a dataset having a plurality of input strings, means for receiving a declarative user input associated with a desired string transformation sub-program to be performed using the dataset as input, means for, in a search space having a plurality of string transformation sub-programs, reducing the search space based on (i) the user input associated with the desired string transformation sub-program and (ii) the plurality of input strings of the dataset, to thereby form a reduced search space, the reduced search space having at least one string transformation sub-program that is configured to transform the dataset and means for selecting, from the reduced search space, one or more suggested string transformation sub-programs. In this aspect, reducing the search space alternatively or additionally may include identifying inexact matches between the user input associated with the desired string transformation sub-program and one or more of the plurality of string transformation sub-programs in the search space, such that one or more of the plurality of string transformation sub-programs that do not meet a threshold similarity condition relative to the user input associated with the desired string transformation sub-program are excluded from the reduced search space. In this aspect, the user input alternatively or additionally may includes a specification of a characteristic of output to be produced using the desired string transformation sub-program, and the search space alternatively or additionally may be reduced further based on the specification of the characteristic. In this aspect, selecting the one or more suggested string transformation sub-programs alternatively or additionally may include displaying the one or more suggested string transformation sub-programs at a user interface. In this aspect, the user interface alternatively or additionally may include, for each of the one or more suggested string transformation sub-programs, a respective mechanism for applying that suggested string transformation sub-program to the dataset. In this aspect, the system alternatively or additionally may comprise means for, in response to receiving a user input for applying one of the one or more suggested string transformation sub-programs, applying the suggested string transformation sub-program to the dataset, means for determining an alert based on an output resulting from applying the suggested string transformation sub program to the dataset, means for displaying the alert at a user interface, and means for providing a mechanism to receive user feedback regarding the alert at the user interface.

Another aspect provides, at a computing device, a method comprising receiving a dataset having a plurality of input strings, receiving a declarative user input associated with a desired string transformation sub-program to be performed using the dataset as input, the user input including a specification of a characteristic of output to be produced using the desired string transformation sub-program, in a search space having a plurality of string transformation sub-programs, reducing the search space based on (i) the user input associated with the desired string transformation sub-program, (ii) the plurality of input strings of the dataset, (iii) and the characteristic, to thereby form a reduced search space, the reduced search space having at least one string transformation sub-program that is configured to transform the dataset and produce output having the characteristic, and selecting, from the reduced search space, one or more suggested string transformation sub-programs. In this aspect, reducing the search space alternatively or additionally may include identifying inexact matches between the user input associated with the desired string transformation sub-program and one or more of the plurality of string transformation sub-programs in the search space, such that one or more of the plurality of string transformation sub-programs that do not meet a threshold similarity condition relative to the user input associated with the desired string transformation sub-program are excluded from the reduced search space. In this aspect, selecting the one or more suggested string transformation sub-programs alternatively or additionally may include displaying the one or ore suggested string transformation sub-programs at a user interface, the user interface including, for each of the one or more suggested string transformation sub-programs, a respective mechanism for applying that suggested string transformation sub-program to the dataset.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method, comprising:
receiving a dataset having a plurality of input strings;
receiving a declarative user input that identifies a desired string transformation sub-program to be performed using the dataset as input;
in a search space having a plurality of string transformation sub-programs, reducing the search space based on (i) the declarative user input and (ii) a datatype of one or more of the plurality of input strings of the dataset, to thereby form a reduced search space, the reduced search space having at least one string transformation sub-program that is configured to transform one or more of the plurality of input strings of the dataset; and
selecting, from the reduced search space, one or more suggested string transformation sub-programs configured to transform one or more of the plurality of input strings of the dataset.

2. The method of claim 1, where the user input further includes a specification of a characteristic of output to be produced using the desired string transformation sub-program, and where the search space is reduced further based on the specification of the characteristic.

3. The method of claim 1, where the search space is reduced by determining a respective congruence between one or more transformed outputs and a desired output, the one or more transformed outputs respectively produced by applying one or more of the plurality of string transformation sub-programs in the search space to the dataset, and the desired output inferred from the user input that identifies the desired string transformation sub-program.

4. The method of claim 1, where reducing the search space includes identifying inexact matches between the user input that identifies the desired string transformation sub-program and one or more of the plurality of string transformation sub-programs in the search space, such that one or more of the plurality of string transformation sub-programs that do not meet a threshold similarity condition relative to the user input that identifies the desired string transformation sub-program are excluded from the reduced search space.

5. The method of claim 1, where the one or more suggested string transformation sub-programs includes a suggested string transformation sub-program that is a synonym of the user input that identifies the desired string transformation sub-program.

6. The method of claim 1, where reducing the search space includes identifying one or more clusters among the plurality of input strings, and where selecting the one or more suggested string transformation sub-programs includes, for each cluster, selecting a suggested string transformation sub-program corresponding to that cluster.

7. The method of claim 1, where the declarative user input misspells the desired string transformation sub-program.

8. The method of claim 7, further comprising displaying the one or more suggested string transformation sub-programs at a user interface, where the user interface includes, for each of the one or more suggested string transformation sub-programs, a respective mechanism for applying that suggested string transformation sub-program to the dataset.

9. The method of claim 1, further comprising:
in response to receiving a user input for applying one of the one or more suggested string transformation sub-programs, applying the suggested string transformation sub-program to the dataset;
determining an alert based on an output resulting from applying the suggested string transformation sub-program to the dataset;
displaying the alert at a user interface; and
providing a mechanism to receive user feedback regarding the alert at the user interface.

10. The method of claim 1, further comprising selecting one or more suggested delimiters selected from a predetermined list of delimiters not found in the dataset.

11. The method of claim 1, where selecting the one or more suggested string transformation sub-programs includes ranking the one or more suggested string transformation sub-programs.

12. A system, comprising:
means including an input subsystem for receiving a dataset having a plurality of input strings;
means including the input subsystem for receiving a declarative user input that identifies a desired string transformation sub-program to be performed using the dataset as input;
means including a logic subsystem for, in a search space having a plurality of string transformation sub-programs, reducing the search space based on (i) the declarative user input that identifies the desired string transformation sub-program and (ii) a datatype of the plurality of input strings of the dataset, to thereby form a reduced search space, the reduced search space having at least one string transformation sub-program that is configured to transform the dataset; and
means including the logic subsystem for selecting, from the reduced search space, one or more suggested string transformation sub-programs configured to transform one or more of the plurality of input strings of the dataset.

13. The system of claim 12, where reducing the search space includes identifying inexact matches between the user input that identifies the desired string transformation sub-program and one or more of the plurality of string transformation sub-programs in the search space, such that one or more of the plurality of string transformation sub-programs that do not meet a threshold similarity condition relative to the user input that identifies the desired string transformation sub-program are excluded from the reduced search space.

14. The system of claim 12, where the user input further includes a specification of a characteristic of output to be produced using the desired string transformation sub-program, and where the search space is reduced further based on the specification of the characteristic.

15. The system of claim 12, where selecting the one or more suggested string transformation sub-programs includes displaying the one or more suggested string transformation sub-programs at a user interface.

16. The system of claim 15, where the user interface includes, for each of the one or more suggested string transformation sub-programs, a respective mechanism for applying that suggested string transformation sub-program to the dataset.

17. The system of claim 12, further comprising:
means including the logic subsystem for, in response to receiving a user input for applying one of the one or more suggested string transformation sub-programs, applying the suggested string transformation sub-program to the dataset;
means including the logic subsystem for determining an alert based on an output resulting from applying the suggested string transformation sub-program to the dataset;
means including a display subsystem for displaying the alert at a user interface; and
means including the logic subsystem for providing a mechanism to receive user feedback regarding the alert at the user interface.

18. The method of claim 1, where the declarative user input includes a declarative string identifying the desired string transformation sub-program, and where each of the one or more suggested string transformation sub-programs are identified by a respective string that differs from the declarative string of the declarative user input.

\* \* \* \* \*